March 26, 1963  R. N. CONVEY ET AL  3,082,561

FISH LANDING NET

Filed Jan. 27, 1961

INVENTORS
ROBERT N. CONVEY
EDWIN F. JAWOROWICZ
BY

ATTORNEYS 3,082,561
FISH LANDING NET
Robert N. Convey, 1345 Den Hertog SW., and Edwin F. Jaworowicz, 208 National NW., both of Grand Rapids, Mich.
Filed Jan. 27, 1961, Ser. No. 85,350
4 Claims. (Cl. 43—11)

This invention relates to a net for landing fish. More particularly, this invention relates to a net for landing fish which simultaneously indicates the weight of the fish lifted in the net.

Various types of combination landing nets and weighing devices are presently in existence. However, these structures are complex in nature and for the most part prohibitive in price to the average fisherman. Due to the complexity of the device provided for weighing the fish, the nets are often awkward in appearance and do not handle easily. Further, when subjected to the use to which the average fish landing net encounters, these complex devices are often inoperative and inaccurate.

It is therefore an object of this invention to provide an improved net for landing fish which simultaneously enables one to weigh the fish lifted in the net.

Another object of this invention is the provision of such a net which utilizes an elongated spring member in its handle structure for the weighing of the fish.

Another object of this invention is to provide such a net, the structure of which is greatly simplified and therefore costs much less to fabricate.

A still further object of this invention is the provision of such a net which achieves the objects set forth, which is positive and accurate in operation, yet durable even through subjected to the usage customarily given fish landing nets.

Yet another object of this invention is to provide a net as described, utilizing a readily demountable hoop enabling one to quickly and easily rethread a new net thereon in case the old net becomes damaged or worn.

These and other objects of this invention will become obvious to those skilled in the fishing tackle art upon reading the following specification in conjunction with the accompanying drawings, wherein.

Figure 1:
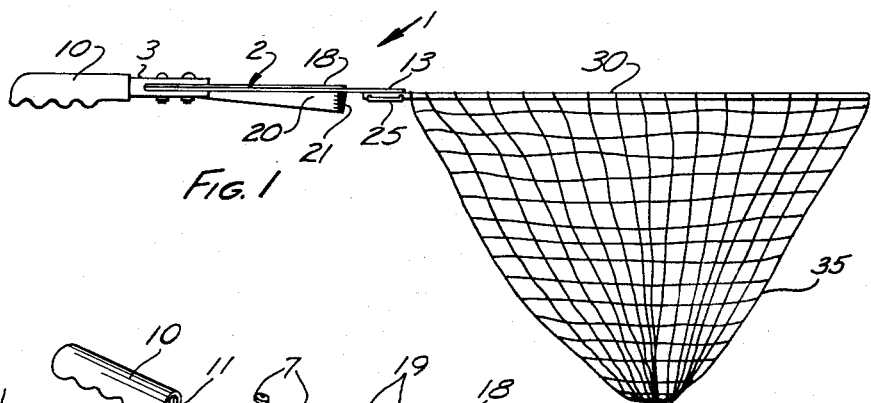
FIG. 1 is a side view of the net for landing fish comprising this invention.

Briefly, this invention relates to a net for landing fish having a handle including a grip portion generally at one end thereof and an elongated spring member at its other end. An indicator element is positioned adjacent the spring member and the spring member is vertically movable with respect to the indicator element. A hoop and net are operably connected to the spring member remote from the grip portion. Calibrated weight markings are provided on the indicator element whereby the weight of a fish lifted in the net moves the spring member downwardly relative to the indicator element to a position adjacent the marking determining the weight of the fish.

Referring more specifically to the drawings, the reference numeral 1 (FIG. 1) designates the net for landing fish of this invention. The landing net 1 includes a handle 2, a hoop 30 secured to one end thereof, with a net 35 threaded on the hoop.

Figure 2:
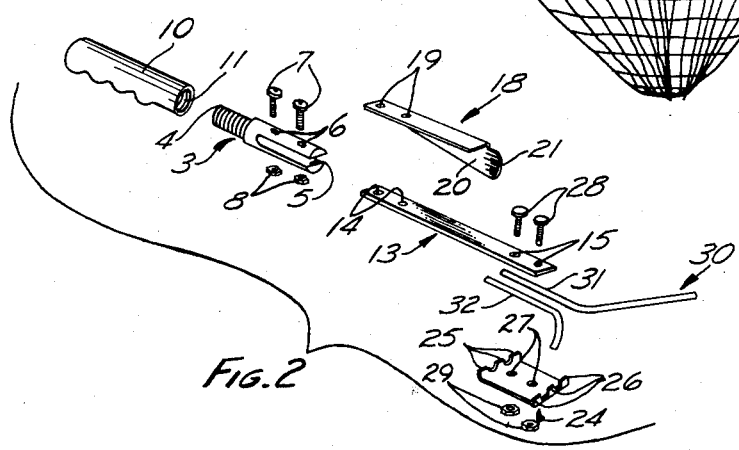
FIG. 2 is a perspective, exploded view showing the component parts of the net shown in FIG. 1.

The handle 2 includes a handle member 3 having a threaded extension 4 on one end thereof and a slot 5 extending into its other end (FIG. 2). Openings 6 extend through the handle member 3, the openings being interrupted by the slot 5. Threaded bolts 7 are provided for extension through the openings 6, together with nuts 8, the purpose of which will be more fully explained hereinafter. A grip portion 10 having a threaded socket 11 is detachably secured to the threaded extension 4 of the handle member 3.

An elongated spring member 13 is provided for insertion into the slot 5 of handle member 3. This spring member is preferably comprised of a flat, hardened strip of spring steel. A pair of apertures 14 extend through the spring member 13 adjacent the end inserted into the slot 5. A pair of apertures 15 extend through the spring member adjacent its other end, the purpose of which will be more fully explained hereinafter.

Figure 3:
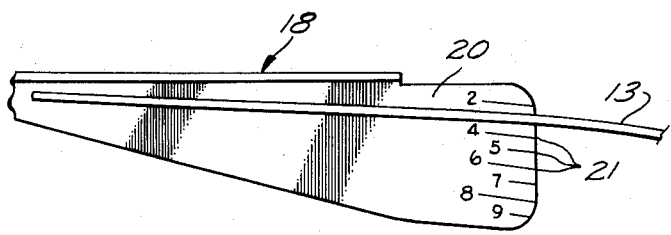
FIG. 3 is an enlarged, side view showing the indicator element and the elongated spring member of the invention in operation.

An indicator element 18, having a depending flange 20 along one of its edges is provided for insertion into slot 5 of handle member 3 above the spring member 13. A pair of apertures 19 are provided through the indicator element 18, apertures 19 aligned with the openings 6 in handle member 3 and apertures 14 in the spring member 13. It will now be noted that the bolts 7 may be inserted into the openings 6, through the apertures 14 and 19, thereby securing the indicator element 18 and the spring member 13 in position upon application of the nuts 8. Normally, the spring member 13 lies against the indicator element 18, the flange 20 thereof adjacent the spring member and depending therebelow as shown in FIG. 1. A plurality of calibrated weight markings are provided on the flange 20 (FIG. 3). These weight markings are calibrated in accordance with the particular spring properties of the spring member 13. That is to say, the load applied to the free end of the spring member 13 will bend it downwardly and the calibrated markings 21 are provided to correspond to the weight applied to the free end of the spring member, the spring bending to an adjacent marking corresponding to the load applied.

The hoop 30 is comprised of a one-piece tubular member, bent to form the hoop, the ends 31 and 32 thereof extending away from the circumference of the hoop thus formed (FIG. 2). It will be be noted that a net 35 may be easily threaded upon such a hoop, since the ends are not joined. A clamp 24 having three ears 25 and three ears 26 at its respective ends is provided for attaching the hoop 30 to the spring member 13. A pair of apertures 27 extend through the clamp 24, the bolts 28 provided for insertion therethrough together with the nuts 29 for attachment purposes. It will now be seen that the legs 31 and 32 of the hoop 30 are adapted to lie between the ears 25 and 26 of the clamp 24. The free end of the elongated spring member 13 is then placed on top of these legs, the bolts 28 extending through the apertures 15 of the spring member 13, through the apertures 27 of the clamp 24, the tightening of nuts 29 on these bolts securely affixing the hoop 30 and net 35 to the end of the spring member 13.

*Assembly and Operation*

The landing net 1 is assembled as follows. A net 35 is threaded upon the separated hoop 30. An end of the spring member 13 together with an end of the indicator element 18 are inserted into the slot 5 of the handle member 3. Threaded bolts 7 extend through the openings 6 of the handle member 3, through the apertures 19 in the indicator element 18 and through the apertures 14 in the spring member 13. The nuts 8 are threaded on the bolts 7, thereby securely affixing the indicator element and spring in position. The flange 20 of indicator element 18 lies adjacent the spring member 13 and depends therebelow, aiding in preventing lateral movement of the spring. The grip portion 10 is threaded on the extension 4 of the handle member 3. The ends 31 and 32 of the hoop 30 are positioned between the ears 25 and 26 of clamp 24, the free end of the spring member 13 being placed on top of these legs. Bolts 28 then extend through the spring and the clamp 24 to rigidly secure the hoop 30 in position.

In operation, the fisherman grasps the grip 10 and uses the net as he would any other conventional landing net for fish. When the landing net is dipped into the water and the fish is raised from the water, the weight of the fish bends the elongated spring member 13 downwardly, the spring member moving downwardly relative to the indicator element 18. The weight of the fish in the net moves the spring member 13 along the calibrated weight markings 21 provided on the flange 20 of the indicator element 18. Since these markings are calibrated, the weight of the fish lifted in the net moves the spring member downwardly to a position adjacent the marking determining the weight of the fish (FIG. 3). Thus, the landing net of this invention has served the dual purpose of retrieving the fish from the water and simultaneously enabling the angler to determine the weight of the fish netted.

It will be noted that this has been achieved even though simplicity of structure has been retained. Thus, this landing net is more durable and the cost of fabrication is considerably lessened. Further, consistent accuracy in weighing the fish is assured. Since the grip is detachable, different lengths of handles may be provided. Since the hoop in readily detachable and separable, new nets may be threaded on when the old net becomes damaged or worn.

While only one embodiment of this invention has been shown and described, it may be possible to practice this invention through the utilization of certain other embodiments without departing from the spirit and scope thereof. Such other embodiments are to be included as a part of this invention unless the following claims specifically state otherwise.

We claim:

1. A net for landing fish, comprising: a handle member including a grip portion generally at one end thereof and having a slot in its other end; an elongated spring member extending from said other end of said handle member and secured within said slot; an elongated indicator element having a portion thereof positioned and secured within said slot above said spring member; said indicator element including a flange depending from said portion lying adjacent said spring member and depending therebelow; said spring member being vertically movable with respect to said indicator element; a hoop and net operably secured to the free end of said spring member remote from said grip portion; and calibrated weight markings on said flange of said indicator element whereby the weight of a fish lifted in said net moves said spring member downwardly relative to said indicator element to a position adjacent the marking determining the weight of the fish.

2. A net for landing fish, comprising: a handle member including a grip portion generally at one end thereof and having a slot in its other end; an elongated flat spring member extending from said other end of said handle member and secured within said slot; an elongated indicator element having a portion thereof positioned and secured within said slot above said spring member; said indicator element including a flange depending from said portion lying adjacent said spring member and depending therebelow; said spring member being vertically movable with respect to said indicator element; a hoop formed from a single rodlike member, the ends of said rodlike member lying adjacent one another and extending from the hoop formed; a net threaded on said hoop; said ends releasably clamped to said spring member remote from said grip portion; and calibrated weight markings on said flange of said indicator element whereby the weight of a fish lifted in said net moves said spring member downwardly relative to said indicator element to a position adjacent the marking determining the weight of the fish.

3. A net for landing fish as defined in claim 2, said grip portion being readily detachable from said handle member.

4. A net for landing fish, comprising: a handle member including a grip portion generally at one end thereof; an elongated spring member extending from the other end of said handle member; an indicator element having a portion thereof positioned above said spring member; said indicator element including a flange depending from said portion, lying adjacent said spring member and depending therebelow; said spring member being vertically movable with respect to said indicator element; a hoop formed from a single rodlike member, the ends of said rodlike member lying adjacent one another and extending from the hoop formed; a net threaded on said hoop; said ends being releasably clamped to said spring member remote from said grip portion; and calibrated weight markings on said flange of said indicator element whereby the weight of a fish lifted in said net moves said spring member downwardly relative to said indicator element to a position adjacent the marking determining the weight of the fish.

References Cited in the file of this patent

UNITED STATES PATENTS

| | | |
|---|---|---|
| 2,129,469 | Hedges | Sept. 6, 1938 |
| 2,633,351 | Fowle | Mar. 31, 1953 |
| 2,741,053 | Moore | Apr. 10, 1956 |
| 2,816,750 | Martin | Dec. 17, 1957 |
| 2,921,397 | Luthi | Jan. 19, 1960 |

FOREIGN PATENTS

| | | |
|---|---|---|
| 227,451 | Germany | Oct. 22, 1910 |
| 281,025 | Germany | Dec. 10, 1914 |